United States Patent
Pothukuchi et al.

(10) Patent No.: US 11,003,821 B1
(45) Date of Patent: May 11, 2021

(54) DETERMINISTIC LOOP BREAKING IN MULTI-MODE MULTI-CORNER STATIC TIMING ANALYSIS OF INTEGRATED CIRCUITS

(71) Applicant: Cadence Design Systems, Inc., San Jose, CA (US)

(72) Inventors: Sri Harsha Pothukuchi, Santa Clara, CA (US); Amit Dhuria, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/798,260

(22) Filed: Feb. 21, 2020

(51) Int. Cl.
*G06F 30/3315* (2020.01)
*G06F 30/333* (2020.01)
G06F 111/04 (2020.01)
G06F 119/12 (2020.01)

(52) U.S. Cl.
CPC ........ *G06F 30/3315* (2020.01); *G06F 30/333* (2020.01); *G06F 2111/04* (2020.01); *G06F 2119/12* (2020.01)

(58) Field of Classification Search
CPC ............... G06F 30/3315; G06F 30/333; G06F 2111/04; G06F 2119/12
USPC ........................................................ 716/113
See application file for complete search history.

(56) References Cited

U.S. PATENT DOCUMENTS

| | | | | |
|---|---|---|---|---|
| 5,650,938 | A * | 7/1997 | Bootehsaz | G06F 30/33 716/102 |
| 7,337,100 | B1 * | 2/2008 | Hutton | G06F 30/39 703/13 |
| 7,735,030 | B1 * | 6/2010 | Kalil | G06F 30/33 716/136 |
| 9,058,440 | B1 * | 6/2015 | Kolpekwar | G06F 30/33 |
| 2005/0172250 | A1 * | 8/2005 | Kucukcakar | G06F 30/3312 716/113 |
| 2007/0245285 | A1 * | 10/2007 | Wang | G06F 30/327 716/104 |

* cited by examiner

*Primary Examiner* — Suresh Memula
(74) *Attorney, Agent, or Firm* — Foley & Lardner LLP (57) ABSTRACT

The present embodiments relate to static timing analysis (STA) of circuits. The STA can be carried out concurrently for multiple-mode-multiple-corners (MMMC) for circuits including combinational loops. The STA includes determining hard breaking points in the loop associated with each single-mode-single-corner (SMSC) view. The STA also includes merging constraints of all SMSC views to generate a merged set of constraints. The STA includes running MMMC STA for the circuit based on the merged set of constraints. The STA also includes determining a soft breaking point for the loop in the MMMC view for timing propagation and settling. The STA maintains consistency of breaking points across SMSC and MMMC views.

20 Claims, 7 Drawing Sheets

DETERMINISTIC LOOP BREAKING IN MULTI-MODE MULTI-CORNER STATIC TIMING ANALYSIS OF INTEGRATED CIRCUITS

TECHNICAL FIELD

The present disclosure relates generally to integrated circuits, including but not limited to methods and apparatuses for static timing analysis of integrated circuits.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. Prior to fabrication of the integrated circuit design, the design can be analyzed to ensure that it meets design constraints. The design constraints can include, for example, signal propagation delays through one or more portions of the designed integrated circuit and power consumption of the designed integrated circuit. The EDA tools can analyze timing delays in the designed integrated circuit. For example, static timing analysis (STA) tools simulate the designed integrated circuit to determine timing characteristics throughout the designed integrated circuit. Designers can, based on the STA analysis, make changes to the design such that that the designed integrated circuit meets the specified design constraints.

SUMMARY

According to some aspects, embodiments relate to a method. The method includes receiving, by a computing system, at least one data file describing a netlist representing an electronic circuit design. The method further includes receiving, by the computing system, constraints for a plurality of single-mode-single-corner SMSC views of the electronic circuit design, each SMSC view of the plurality of SMSC view defining a set of timing constraints for the electronic circuit design. The method also includes identifying, by the computing system, a combinational loop in the electronic circuit design for each SMSC view of the plurality of SMSC views based on the respective set of timing constraints. The method additionally includes determining, by the computing system, a hard breaking point for the combinational loop in each SMSC view of the plurality of SMSC views. The method further includes merging, by the computing system, timing constraints associated with the plurality of SMSC views to generate a merged set of timing constraints for a multi-mode-multi-corner (MMMC) view. The method also includes determining, by the computing system, a soft breaking point associated with the MMMC view based on the merged set of timing constraints, the soft breaking point not breaking timing paths in any of the SMSC views of the plurality of SMSC views. The method additionally includes executing, by the computing system, a static timing analysis (STA) run of the MMMC view based on the merged set of timing constraints, and propagating, by the computing system, timing information across the combinational loop by utilizing the soft breaking point as a settling point.

According to some aspects, embodiments relate to a computer readable storage medium having instructions stored thereon which when executed by one or more processors, cause the one or more processors to execute a method. The method includes receiving, by a computing system, at least one data file describing a netlist representing an electronic circuit design. The method further includes receiving, by the computing system, constraints for a plurality of single-mode-single-corner SMSC views of the electronic circuit design, each SMSC view of the plurality of SMSC view defining a set of timing constraints for the electronic circuit design. The method also includes identifying, by the computing system, a combinational loop in the electronic circuit design for each SMSC view of the plurality of SMSC views based on the respective set of timing constraints. The method additionally includes determining, by the computing system, a hard breaking point for the combinational loop in each SMSC view of the plurality of SMSC views. The method further includes merging, by the computing system, timing constraints associated with the plurality of SMSC views to generate a merged set of timing constraints for a multi-mode-multi-corner (MMMC) view. The method also includes determining, by the computing system, a soft breaking point associated with the MMMC view based on the merged set of timing constraints, the soft breaking point not breaking timing paths in any of the SMSC views of the plurality of SMSC views. The method additionally includes executing, by the computing system, a static timing analysis (STA) run of the MMMC view based on the merged set of timing constraints, and propagating, by the computing system, timing information across the combinational loop by utilizing the soft breaking point as a settling point. According to certain aspects, embodiments relate to a system comprising one or more processors and/or circuitry. The one or more processors and/or circuitry can execute all or any part of the above-mentioned method.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As discussed herein, static timing analysis (STA) of an integrated circuit design can be carried out to ascertain that the design meets timing constraints. In some embodiments, the design can include combinational loops. STA is typically carried out on designs that can be represented by directed-acyclic graphs (DAGs). As combinational loops are not DAGs, these loops need to be broken in order to carry out STA. In one approach, the loops can be broken by introducing a breaking point within the loop. The position of the breaking point within the loop can also break other larger timing paths that pass through the breaking point. Thus, changes in the position of the breaking point can cause changes in the timing characteristics generated by the STA. STA can be carried out for the design under various modes of operation and under various operating conditions or corners. For example, a single-mode-single-corner (SMSC) STA refers to the STA of the design for a combination of a single mode and a single corner. Similarly, multi-mode-multi-corner (MMMC) STA refers to the STA of the design concurrently for a combination of multiple modes and multiple corners. An SMSC view can refer to the timing view associated with a single mode and a single corner STA run. An MMMC view can refer to the timing view associated with a concurrent MMMC STA run.

In some implementations, the EDA tool may select a breaking point for a loop during an SMSC STA that is different from the breaking point selected for the same loop during a concurrent MMMC STA. In other words, the breaking point of a loop in an SMSC view may be different from the breaking point selected for the loop in the same view when doing concurrent MMMC STA. Different breaking points in the same loop can result in different timing paths, and therefore, different timings. As a result, a view in SMSC may have different timing characteristics than the same view in a concurrent MMMC STA run. In some instances, similar inconsistencies in the selection of breaking points can occur across multiple runs of the same design in a SMSC run. In some other instances, STA can lead to engineering change orders (ECO), which can change one or more components of the netlist of the design to meet timing constraints. In some implementations, the selection of a breaking point for the same loop prior to ECO can be different from the breaking point selected for the same loop after the ECO.

As discussed herein, the methods and systems provide an approach that improves the consistency of selection of a breaking point of the same loop. In particular, as discussed in further detail below, loop breaking points for each view is determined independently of other views. This ensures that breaking points stay consistent for the same view across SMSC STA runs and concurrent MMMC STA runs. In particular, the timing paths for a view in SMSC is the same as the timing path for the same view in MMMC. As a result, the timing characteristics of a view do not change with the change in the type of the STA run (SMSC or concurrent MMMC). For the concurrent MMMC STA run, a common soft breaking point is determined. This soft breaking point is utilized for phase propagation and timing settling. To reduce the time required for determining the individual breaking points for each view, structural loops in the design are identified in the design. These structural loops are determined agnostic to the constraints associated with each view. Thereafter, the breaking points for each view are determined from the set of identified structural loops only. In this manner, for each view, the breaking point determination is limited to the limited number of identified structural loops, and is not based on the entire netlist of the design.

Figure 1:
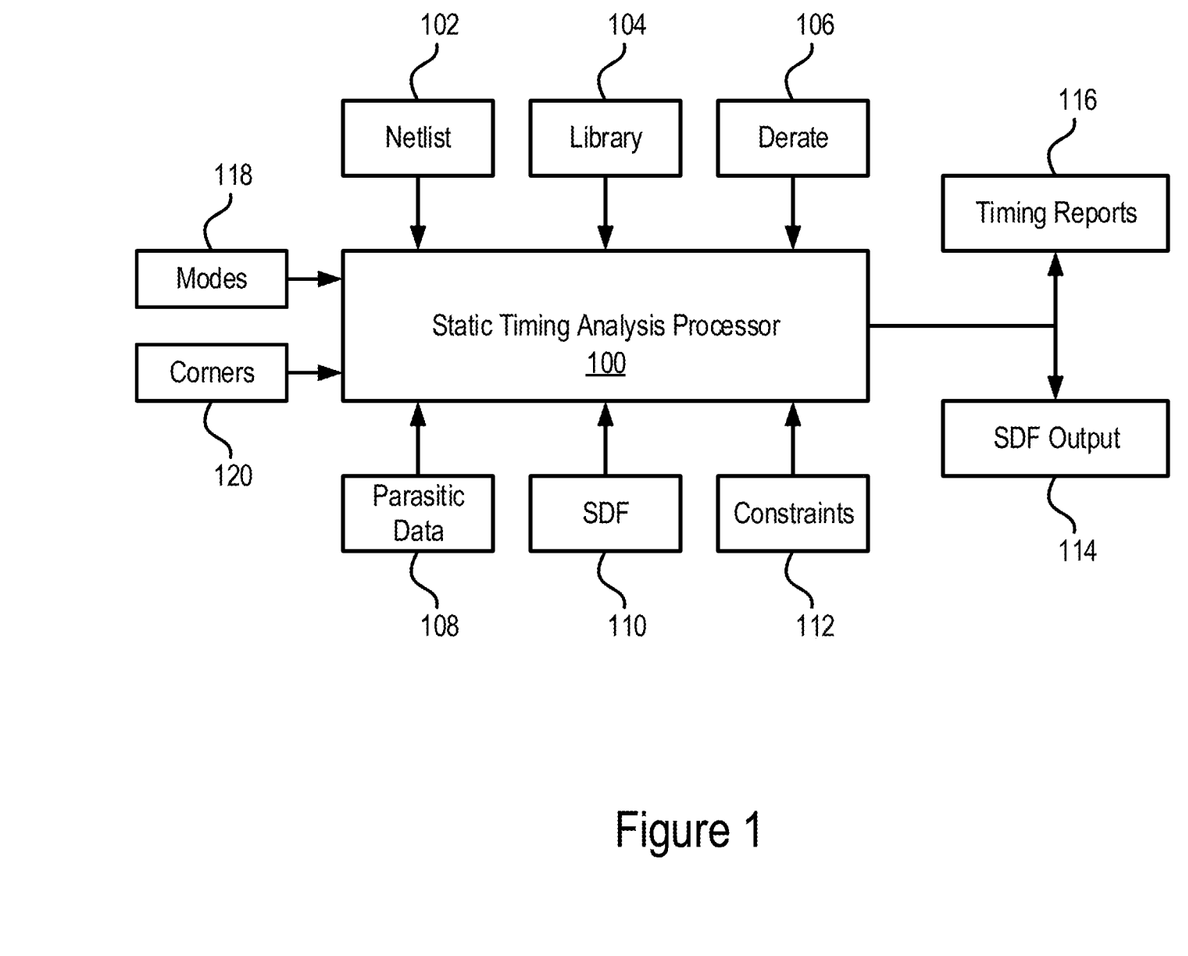
FIG. 1 depicts an example block diagram of static timing analysis (STA) of a circuit design, according to present embodiments.

FIG. 1 depicts an example block diagram of static timing analysis (STA) of a circuit design. A STA processor 100 can be used to carry out STA on a circuit design. The STA processor 100 can receive as inputs a netlist definition 102, delay library 104, derate information 106, parasitic data 108, standard delay format data 110, constraints 112, modes 118, and corners 120. The netlist definition 102 can include a model that defines a circuit that is to be analyzed. In particular, the netlist definition 102 can provide a description of the connectivity of various electronic components within the circuit. As an example, the netlist definition 102 can include a gate level description of the circuit design, which describes the connectivity of various logic gates within the circuit. The delay library 104 can include delay information associated with various standard gates (e.g., AND gate, OR gate, NAND gate, etc.), macros, and non-standard gates described in the netlist. In some instances, the delay information can include minimum and maximum delay associated with the gates. Derate information 106 specify derate factors associated with one or more components of the circuit. Derate factors can model the effects of varying operation conditions by adjusting delay values calculated for individual timing arcs associated with one or more components of the circuit. Parasitic data 108 can include capacitive, inductive, and electromagnetic coupling data associated with interconnects in the circuit. The parasitic data can be used to adjust delay values between circuit stages. Standard delay format data (SDF) 110 can include predefined delays for certain gates or interconnects in a standard format. Constraints 112 can include values of parameters against which the design can be evaluated. For example, the constraints can include required times for delays across gates, circuit paths, circuit modules, and input/output pairs, and other portions of the circuit.

In some embodiments, the timing analysis can be carried out over various scenarios. For example, the scenarios can include various operational scenarios or modes or various operating conditions or corners. Operating modes 118 can indicate the specific operation of the design. An operating mode can be defined by a set of clocks, supply voltages, timing constraints, and libraries. The mode can also have annotation data, such as SDF or parasitics files. For example, operating modes can include sleep mode operation, low power mode operation, debug mode operation, test mode operation (e.g., built-in-self-test, jtag, etc.), etc.

A corner 120 can be defined as a set of libraries characterized for process, voltage, and temperature variations. Corners 120 are not dependent on functional settings. Instead, corners 120 are meant to capture variations in the manufacturing process, along with expected variations in the voltage and temperature of the environment in which the chip will operate. The operating conditions or corners 120 can specify the conditions under which the STA is to be run, and can include various process (P), voltage (V), and temperature (T) combinations. Example corners can include WCS (slow process, low power supply, high temperature), BCF (fast process, high power supply, low temperature), Typical (typical process, nominal power supply, nominal temperature), WCL (worst-case slow process, low power supply, low temperature), or any other combination of P, V, and T. In some implementations, the corners can also include parasitic corners that specify various RC interconnect corners, such as for example, Typical (nominal values for interconnect resistance and capacitance), Min C (minimum values for interconnect capacitances and typical values for interconnect resistance), Max C (maximum values for interconnect capacitances and typical values for interconnect resistance), Min RC, Max RC, etc. Each of the modes 118 and corners 120 specify constraints or parameters that apply to the particular mode or corner.

The STA processor 100 can take into consideration the above mentioned inputs and generate timing information for the circuit represented by the netlist 102. The STA processor 100 may not simulate the circuit described by the netlist 102 to determine the timing information. That is, the timing information can be independent of the data values being applied at input pins of the circuit. In some examples, the STA processor 100 can generate an SDF output 114, which include the delays determined for each gate within the netlist. The STA processor 100 also can generate timing reports 116, which can include timing characteristics of the circuit. For example, the timing reports 116 can identify the circuit paths and circuit stages that may violate the constraints 112 (such as required time). That is, the timing report 116 can identify circuit paths and circuit stages that have arrival times that are greater than their respective required times specified in the constraints 112. In some instances, where the circuit includes sequential logic in addition to combinatorial logic, the timing reports 116 may include a list of circuit paths that violate setup and hold times between any two sequential logic circuits. The setup and hold times may be specified by the constraints 112. The STA processor 100 can generate the SDF output 114 and the timing reports based on the modes 118 and the corners 120 as discussed in further detail herein. The SDF output 114 and the timing reports can be used to update the timing of the netlist 102. It should be noted that the netlist 102 can include or be implemented by one or more computer-readable files (e.g., GDS II, OASIS, etc.) that describe the circuit layout containing physical locations and dimensions of the circuit's components, interconnections, and various layers from the design, in accordance with a target fabrication process. The one or more files can be provided by a fab so the design can be fabricated to create the integrated circuit. As is well known in the art, the designed integrated circuit can eventually be fabricated by lithography transferring or printing the circuit layout to a semiconductor substrate in a series of layers that collectively will form the features that constitute the devices that make up the components of the integrated circuit.

The STA processor 100 can view the netlist 102 of the circuit as a directed acyclic timing graph, where pins/ports of circuit elements (such as logic gates or other circuit components) and/or the circuit elements can be considered as nodes of the timing graph, and interconnects between the nodes can be considered as edges of the timing graph. For example, a two input NAND gate circuit (which includes two input pins and one output pin) can include two nodes corresponding to the two input pins, one node corresponding to the NAND gate logic, and another node corresponding to the output pin. The interconnects connecting these nodes can be considered as edges. In another approach, (known as the pin node convention) each pin/port of the logic gate is considered as a node.

Regardless of the convention used to correspond circuit elements and interconnects to nodes and edges of the timing graph, the STA processor 100, based on the inputs, can assign delays to the nodes and the edges of the timing graph. For example, the STA processor 100 can assign delays to each of the two edges corresponding to the two input NAND gate, and assign a set of delays to the NAND gate logic. The set of delays assigned to the NAND gate logic represent the different delays of the gate logic based on the transitioning input, the direction of transition (rise or fall), and the resulting transition of the output. Where the netlist includes both combinatorial and sequential logic, the STA processor 100 can represent the netlist as a set of combinatorial blocks that lie between the sequential elements, and generate timing graphs for each of the combinatorial blocks.

The STA processor 100 can determine timing paths within the timing graph. As an example, a path on the timing graph between two points can represent a timing path. In some examples, a timing path can begin at an endpoint, such as an input port or a register output, and end at another endpoint such as an output port or a register input. The register input and output can refer to, for example, input and output, respectively, of one or more flip-flops, while the input/output ports can refer to input/output ports of combinatorial logic blocks. Each node and edge in the timing path can have an associated delay. For example, a node representing a gate logic can have an associated gate delay (or propagation delay), and edges representing interconnects can have associated wire delays or transition delays. A timing path may also represent a signal delay between the endpoints. For example, a timing path between two endpoints can include signal delays of all nodes and edges between the two endpoints. The delays associated with the nodes and edges can correspond to gate delays and wire delays or transition delays of gates and interconnects between the two endpoints. The timing path may also be represented by a series of timing arcs, where each timing arc describes the timing relationship between an input pin and an output pin of a gate (e.g., a cell timing arc) or between an output pin and an input pin of an interconnect (e.g., a wire timing arc). Each timing arc can describe a delay across the timing arc as well as a unateness (positive, negative, or non-unate) of the timing arc. The STA processor 100 can utilize the timing arc information to determine delays associated with a timing path.

The STA processor 100 can carry out STA for various combinations of modes 118 and corners 120. For example, a single-mode-single-corner (SMSC) analysis takes into consideration one mode and one corner. Multi-mode-multi-corner (MMMC) analysis takes into consideration multiple modes and multiple corners. A timing view (also simply referred to as "a view") can refer to a combination of a process corner and an operating mode for one type of timing check, such as, for example, a setup or hold times. Thus, an SMSC STA can represent one timing view, with respect to a single mode and a single corner. An STA analysis for an SMSC can load the libraries and constraints associated with the particular mode and corner and generate a timing graph corresponding to the design. Based on the constraints associated with each mode and corner, different SMSC views can generate different timing graphs, and therefore may differ in their timing analysis. MMMC STA relates to combining the constraints of more than one mode and more than one corner to generate a concurrent STA. Even with a few modes and corners, the combination of the modes and corners can result in a large number of views. The STA processor 100 may have to run the STA for each such combination, thereby undesirably increasing the total run time. The concurrent MMMC STA is typically utilized to reduce the run time associated with multiple individual SMSC STAs. Further, by considering various modes and corners concurrently, the effect of changes made to the design can be observed for all the modes and corners at the same time.

In some instances, the circuit design can include one or more combinational loops. A combinational loop in a circuit can be formed when a signal path from an output of a component can be traced back to the input of the same component. STA cannot be carried out directly on combinational loops. STA operates on transforming the netlist into a DAG, and loops are inherently not acyclic. Therefore, STA tools typically break the loops by inserting breaking points so that the loop can be converted into a DAG. The breaking point however, can be used for phase propagation.

Figure 2A:
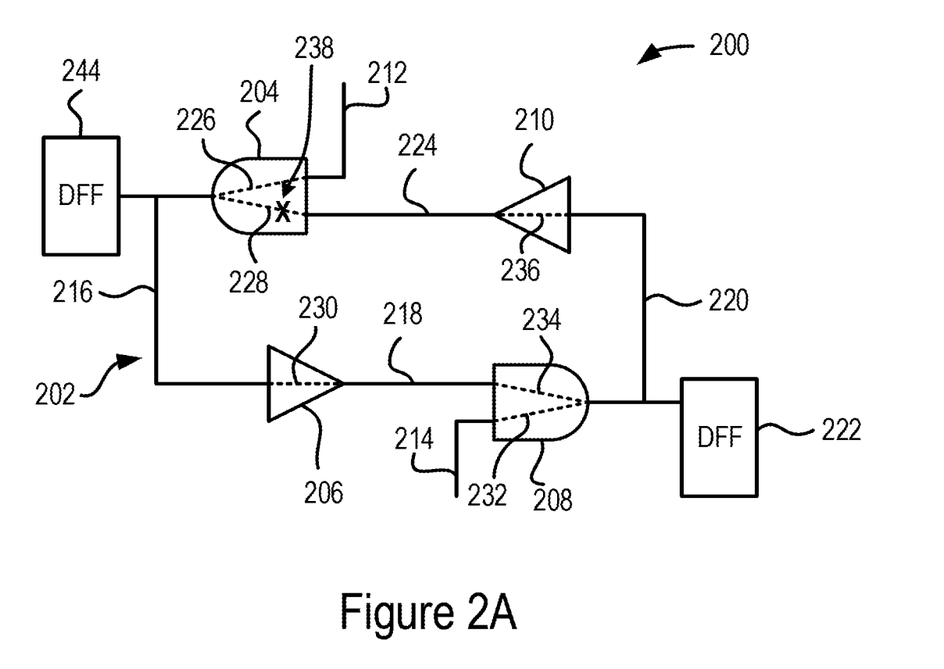
FIGS. 2A, 2B, and 2C show different breaking points for the same loop in different views, according to the present embodiments.
Figure 2B:
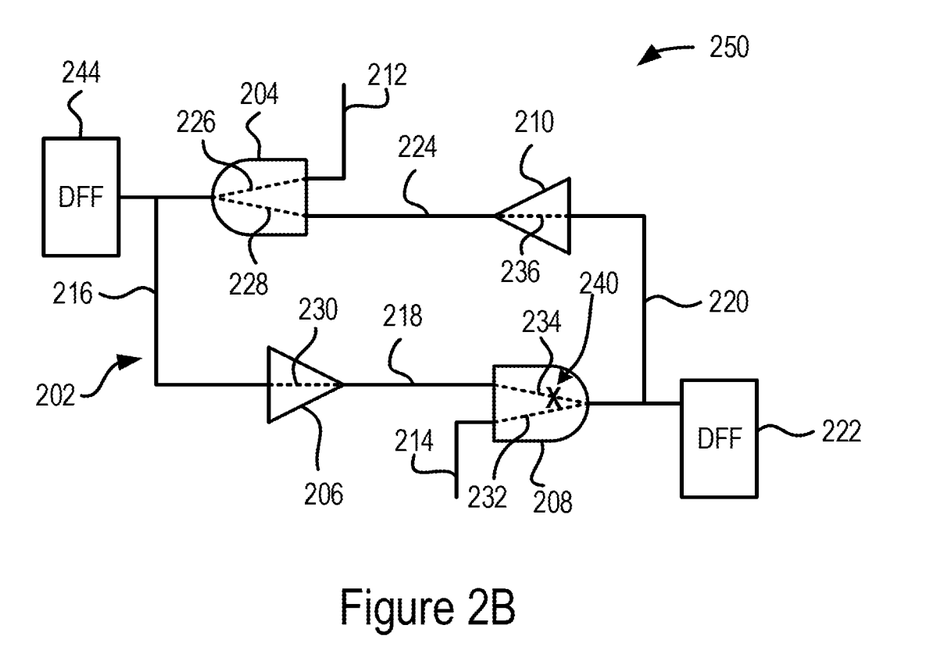
Figure 2C:
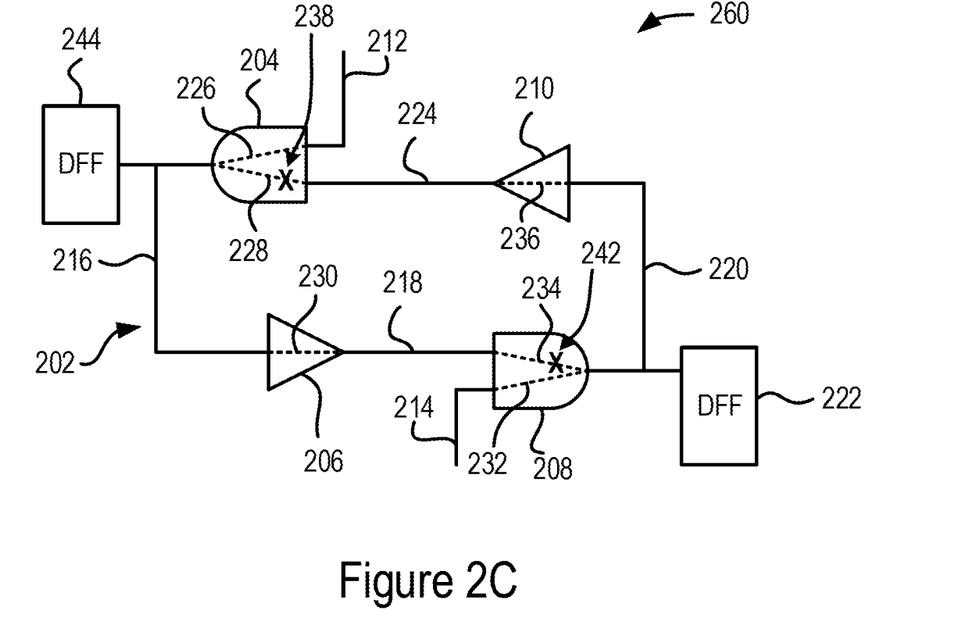

FIGS. 2A, 2B, and 2C show different breaking points for the same loop in different views. In particular, FIG. 2A shows a first view 200 associated with the combinational loop 202, FIG. 2B shows a second view 250 associated with the combinational loop 202, and FIG. 2C shows a concurrent MMMC view combining the first view 200 and the second view 250. The first and second views 200 and 250 can include circuitry in addition to the that shown in FIGS. 2A and 2B. The combinational loop 202 includes a first AND gate 204, a first buffer 206, a second and gate 208, and a second buffer 210. The first AND gate 204 receives a first AND gate input 212, and the second and gate 208 receives a second AND gate input 214. A first net 216 couples the output of the first and gate 204 to the input of the first buffer 206 and the input of the first D flip-flop 244, a second net 218 couples the output of the first buffer 206 to a input of the second AND gate 208, a third net 220 couples the output of the second AND gate to the input of the second buffer 210 and an input of a second D flip-flop 222, and a fourth net 224 couples the output of the second buffer 210 to an input of the first AND gate 204. The combinational loop 202 includes the first AND gate 204 the first net 216, the first buffer 206, the second net 218, the second AND gate 208, the third net 220, the second buffer 210, and the fourth net 224. Each component also defines one or more delay arcs. For example, the first AND gate 204 defines a first delay arc 226 between the input of the first AND gate 204 that receives the first AND gate input 212 and the output of the first AND gate 204, and a second delay arc 228 between the input of the first AND gate 204 that is coupled to the fourth net 224 and the output of the first AND gate 204. Similarly, the first buffer 206 defines a delay arc 230 between the input and the output of the first buffer 206. The second AND gate 208 defines a first delay arc 232 between the input of the second AND gate 208 that is coupled to the second AND gate input 214 and the output of the second AND gate 208, and a second delay arc 234 between the input of the AND gate 208 coupled with the second net 218 and the output of the second AND gate 208. The second buffer 210 includes a delay arc 236 between the input and the output of the second buffer 210.

A loop breaking process can select a breaking point within the combinational loop 202. For example, the STA processor 100, discussed above in relation to FIG. 1, can select a breaking point anywhere along the loop 202. The breaking point can be selected at any one of the delay arcs of any one of the components of the combinational loop 202. The selection of the loop breaking point can be based on several factors, such the constraints defined for the particular view. The constraints can include whether a create_clock constraint has been defined for the view, or whether constants or set disable timing of delay arcs or nets has been defined in the constraints. In some implementations, the STA processor 100 may give priority to one constraint over the other in selecting the location of the breaking point in the combinational loop 202. For example, the STA processor 100 may give priority to the create_clock constraint over all others in selecting a breaking point to ensure that the constraint is met despite the inclusion of the breaking point. Additional factors can include whether the selected breaking point also breaks critical paths that pass through the combinational loop, and if it does, the STA processor 100 may select a different breaking point that does not break the critical path. The STA processor 100, in summary, may select a breaking point for a view based, in part, on the constraints of the view.

FIG. 2A shows an example first breaking point 238 selected by the STA processor 100. The first breaking point is selected on the second delay arc 228 of the first AND gate 204. The STA processor 100 can select the location of the first breaking point based on the constraints associated with the first view 200. In a similar manner, the STA processor 100 can select a second breaking point 240 as shown in FIG. 2B. The second breaking point 240 is selected on the second delay arc 234 based on the constraints associated with the second view 250. FIGS. 2A and 2B show by example that various views of the same loop can result in different locations of the breaking point due to different constraints associated with the respective views.

FIG. 2C shows a concurrent MMMC view 260 combining the first view 200 and the second view 250 shown in FIGS. 2A and 2B. The STA processor 100 combines the constraints associated with the first view 200 and the constraints associated with the second view 250 to generate the third view 260, that represents the concurrent MMMC view. The STA processor 100 can merge the constraints associated with the first view 200 and the second view 250 to generate merged constraints that are applied to the combinational loop 202. The third view 260 merges the constraints of the first view 200 and the second view 250. The merging of the constraints in the first view 200 and the second view 250 results in a new set of constraints. As mentioned above, the STA processor 100 takes into consideration the constraints associated with the view to determine the location of the breaking point in the loop 202. As an example, the new set of constraints result in the STA processor 100 selecting a third breaking point 242 at the second delay arc 234 of the second AND gate 208. The STA processor 100 utilizes the third breaking point as a common breaking point to analyze individual views in the concurrent MMMC STA run. As a result, the first view 200, which as shown in FIG. 2A has a breaking point at the second delay arc 228 of the first AND gate 204, has a different breaking point: the third breaking point 242 at the second delay arc 234 of the second AND gate 208. Thus, the same first view has different breaking points in SMSC STA and in concurrent MMMC STA. The different breaking points can result in different timing paths in each view. For example, in the first view 200 shown in FIG. 2A, the timing path of the broken loop begins at the first AND gate input 212 and ends at the third net 220. On the other hand, the timing path for the first view in a concurrent MMMC STA begins at the first AND gate input 212 and terminates at the second net 218 (before the third breaking point 242). The different timing paths for the same view of the same loop across SMSC and concurrent MMMC can cause convergence issues in the design flow.

Figure 3:
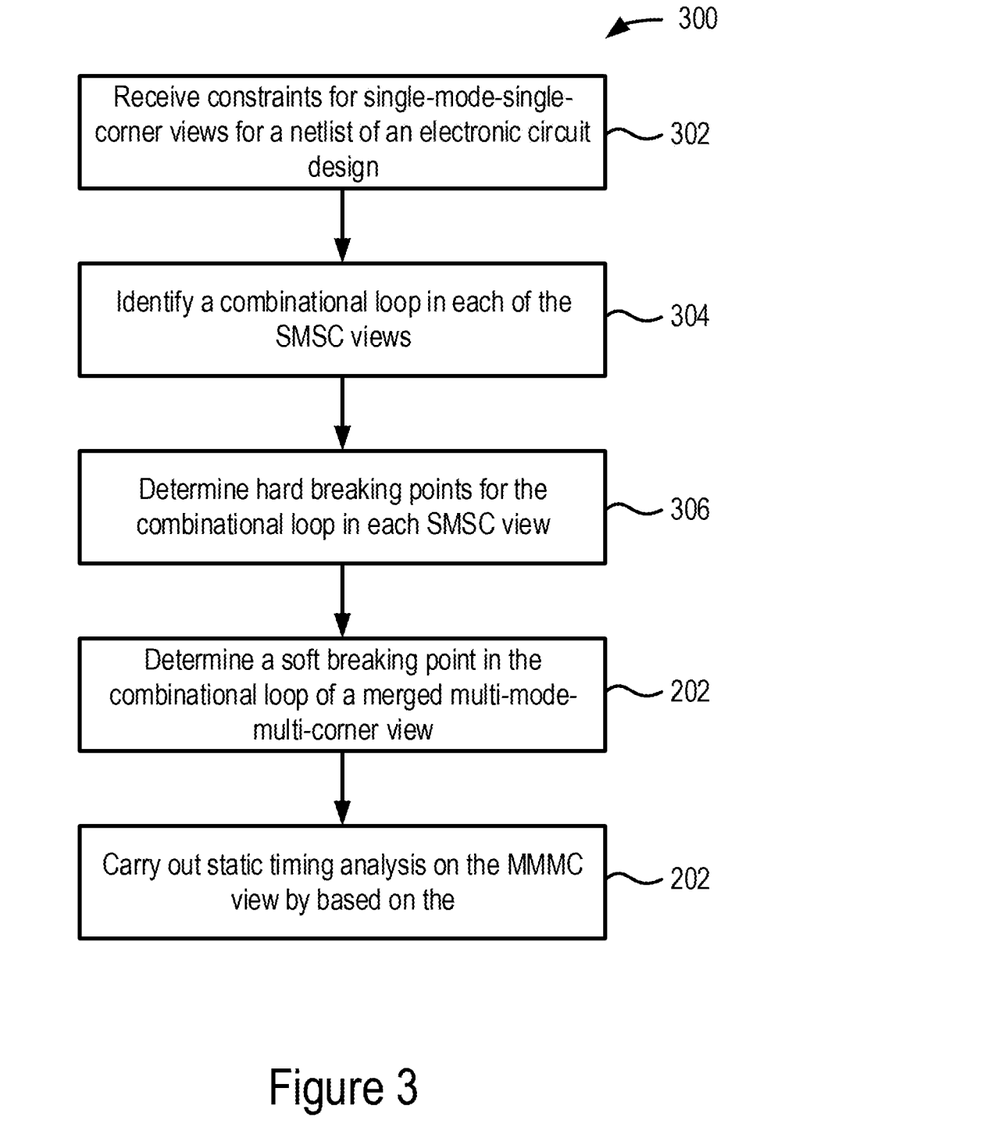
FIG. 3 shows a flow diagram of a process for generating consistent breaking points in combinational loops in designs, according to the present embodiments.

FIG. 3 shows a flow diagram of a process 300 for generating consistent breaking points in combinational loops in designs. The process 300 can be executed, for example, by the STA processor 100 discussed above in relation to FIG. 1. The process 300 includes receiving constraints for SMSC views for a netlist of an electronic circuit design (302). As mentioned above, the STA processor 100 can utilize various modes and corners to generate views. For example, the STA processor 100 can receive constraints associated with various modes 118 and various corners 120 discussed above. The STA processor 100 also can receive a list of various combinations of modes and corners for which the user would like to carry out STA. For example, the list of constraints can identify carrying out an STA of the design for combination of a low power mode and a WCS (slow process, low power supply, high temperature) corner. This combination can have the associated constraints for low power mode and the libraries associated with the WCS corner. The STA processor 100, in some implementations, can generate constraints for the SMSC view based on combined constraints and libraries for the respective mode and the respective corner.

The process 300 further includes identifying a combinational loop for each of the SMSC views (304). The STA processor 100 can utilize the constraints associated with each SMSC view and determine combinational loops in the design. The STA processor 100 can determine loops within the design based on standard loop identifying tools available with the EDA software (such as, for example, Innovus™ and Tempus™ by Cadence®). Generally, the STA processor 100 can execute a tool that identifies strongly connected components in the design. In some instances, the STA processor 100 can transform the netlist into a graph, and then determine strongly connected components with the graph. Strongly connected components include those combinational gates that are connected in a loop. The STA processor 100 can determine strongly connected components within the netlist based on graph processing algorithms, such as, for example, Kosaraju's algorithm, Tarjan's strongly connected components algorithm, a path-based strongly connected component algorithm, etc. in some instances, the STA processor 100 may utilize breath-first-search algorithms to determine combinational loops. The breath-first-search algorithms can utilize forward and backward reachability queries from each vertex of the graph to determine the existence of strongly connected components. The breath-first-search algorithms can be parallelized, thereby reducing the time required to determining the loops. It should be noted that the STA processor 100 can apply the constraints for a view to the netlist prior to identifying the combinational loops within the netlist. The application of constraints, such as for example, disabling nodes or nets, placing inputs or nodes at a constant value, etc., can break previously existing loops, thereby reducing the number of loops within the constrained design.

The process 300 can further include determining hard breaking points for the combinational loops in each view (306). The STA processor 100 can determine hard breaking points in each of the combinational loops identified in each view. In some instances, the STA processor 100 can determine the loop breaking point based on several factors, such as the constraints defined for the particular view. The constraints can include whether a create_clock constraint has been defined for the view, or whether constants or set disable timing of delay arcs or nets has been defined in the constraints. As an example, a create_clock constraint associated with a pin indicates that a clock is being created at that pin. Creating a clock at a pin can render irrelevant any timing path into that pin. In view of this outcome, the STA processor 100 can select a breaking point at a delay arc of a logic gate immediately preceding the pin. In some implementations, the STA processor 100 may give priority to one constraint over the other in selecting the location of the breaking point in the combinational loop 202. For example, the STA processor 100 may give priority to the create_clock constraint over all others in selecting a breaking point to ensure that the constraint is met despite the inclusion of the breaking point. Additional factors can include whether the selected breaking point also breaks critical paths that pass through the combinational loop, and if it does, the STA processor 100 may select a different breaking point that does not break the critical path. The STA processor 100, in summary, may select a breaking point for a view based, in part, on the constraints of the view. The STA processor 100 can determine breaking points based on standard tools available with the EDA software (such as, for example, Innovus™ and Tempus™ by Cadence®).

Figure 4:
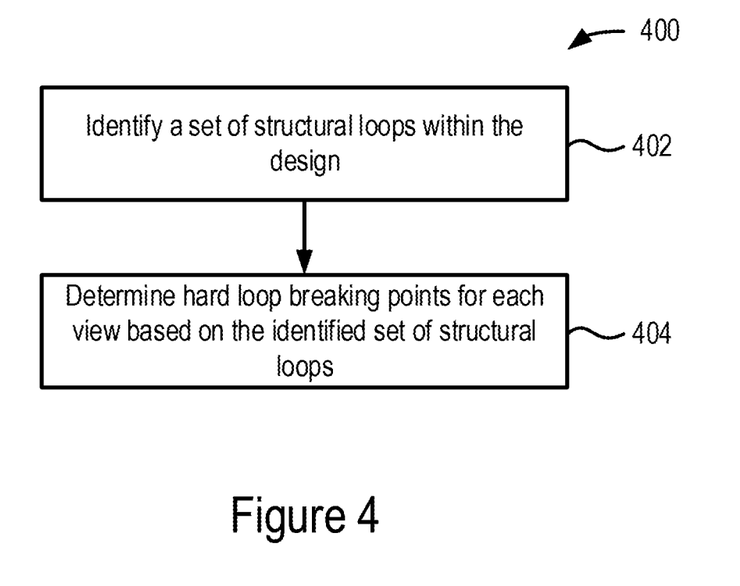
FIG. 4 shows a flow diagram of a process for determining loop breaking points, according to the present embodiments.

The STA processor 100 may have to carry out determining the combinational loop and the breaking point within the loop for each view. Where there are large number of views, this can be time consuming. In particular, the time for determining the loops and the loop breaking points for each view can include processing the entire netlist for identifying loops and then determining breaking points within the identified loops. In some instances, the STA processor 100 may alternatively determine structural loops within the netlist first, and then determine loops and breaking points based on the constraints associated with each view. FIG. 4 shows a flow diagram of a process 400 for determining loop breaking points. The process 400 includes identifying a set of structural loops within the design (402). The STA processor 100 can analyze the netlist of the design without taking into consideration any constraints imposed by the various views to determine combinational loops. The example algorithms discussed above can be applied to the entire netlist only once to determine the structural loops. The process 400 further includes determining breaking points for each view based on the constraints applied to the identified structural loops (404). It should be noted that the view based constraints are applied to the identified set of structural loops, and not to the entire netlist. As a result, the time required to complete the process of determining breaking points within the loops is reduced. It should be noted that not all views may have the same structural loop present. For example, some constraints may disable one or more nets or cell arcs within a structural loop while the constraints of another view may not. The disabled nets or cell arcs may result in structural loop not being a loop in the particular view. Thus, the STA processor 100 may not even have to determine the loop breaking point for that loop in that view—further saving processing time.

Regardless of the approach taken to determine the loop breaking points, the STA processor 100 can treat the loop breaking points for each view as hard breaking points. In particular, the STA processor 100 can use the breaking points for the loop to actually break the loop for STA timing determination. However, the hard loop breaking point for one view is invisible to other views. In particular, the hard loop breaking point for one view is not necessarily imposed as a hard breaking point for other views. This is in contrast with traditional concurrent MMMC STA processes where a single common loop breaking point is determined for the combined views, and that common loop breaking point is imposed on each view to determine the timing paths for that view. The STA processor 100 instead maintains the hard loop breaking point for a view for that view, such that the timing paths determined for that view in concurrent MMMC are determined based on the respective view's hard breaking point. Maintaining the hard loop breaking point for the particular view allows the STA processor 100 to maintain consistency between the loop breaking point determined for the SMSC STA run and for the concurrent MMMC STA run for the loop in the same view.

Turning again to process 300 in FIG. 3, the process 300 further includes determining a soft breaking point in the combinational loop in a merged MMMC view. As mentioned above, the STA processor 100 can carry out concurrent MMMC STA for the design to speed up the timing analysis. One approach to carrying out concurrent MMMC STA is to merge the constraints of all the modes and corners into a single MMMC constraint definition and apply the single MMMC constraint definition to the netlist. The STA processor 100 can merge the constraints of various views and corners, for example, by generating a super-set of constraints that are common or consistent across all views. For example, assuming the first view has a timing constraint of create_clock at a first pin and the second view has an associated timing constraint of create_clock at a second pin, the STA processor 100 can merge the timing constraints to generate a merged set of timing constraints for a concurrent MMMC STA including two clocks being created—one at the first pin and another at the second pin—where each clock is visible to its corresponding view. The STA processor 100 can then determine a loop breaking point for the merged MMMC view as the soft breaking point. The STA processor 100, for determining the soft breaking point for the merged MMMC view, uses the same approach discussed above in determining the hard breaking point for a particular view. However, in contrast with the hard breaking point, which is used to actually break the loop for the particular view, the soft breaking point is instead used as a settling point for timing propagation in that particular view. The STA processor 100 can utilize the entire netlist as modified by the merged set of constraints to determine the soft breaking point in the combinational loop 202.

Figure 5:
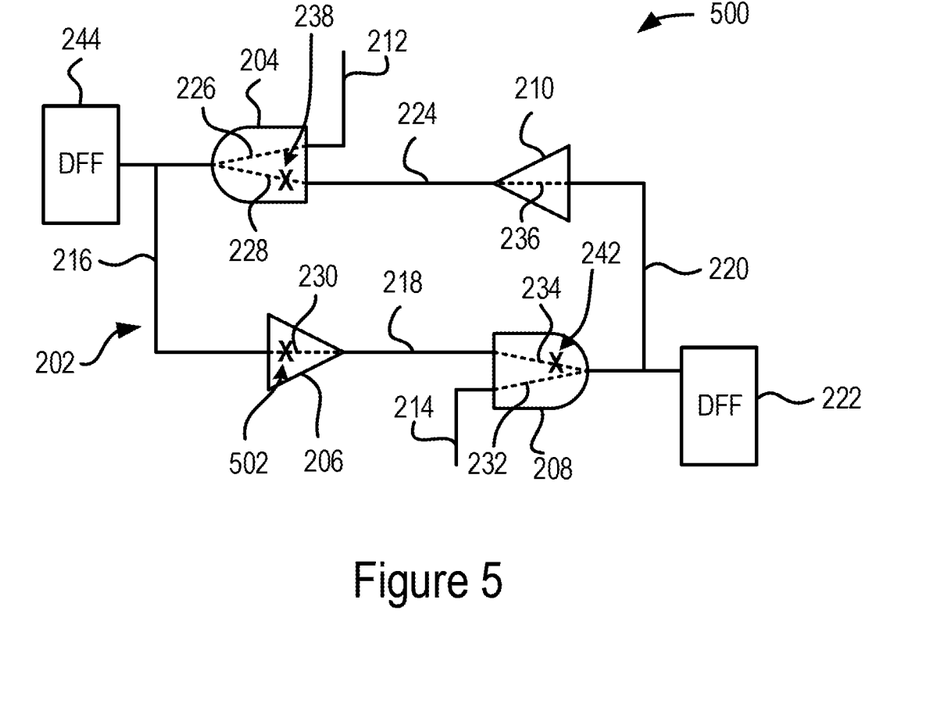
FIG. 5 shows an example soft breaking point in the combinational loop in an multi-mode-multi-corner view, according to the present embodiments.

FIG. 5 shows an example soft breaking point in the combinational loop in an MMMC view. In particular, FIG. 5 shows an MMMC view 500 of the combinational loop 202 discussed above in relation to FIGS. 2A-2C. The STA processor 100 determines a soft breaking point 502 within the combinational loop 202, which in the example shown in FIG. 5 is positioned at the delay arc 230 of the first buffer 206. The position of the soft breaking point 502 shown in FIG. 5 is merely an example, and is a result of the merged constraints associated with the MMMC view 500. It is understood that different merged set of constraints may result in a different location of the soft breaking point 502. As can be seen in FIG. 5, the soft breaking point 502 can be distinct from the hard breaking points: the first hard breaking point 238 and the second hard breaking point 242 determined for the first view and the second view respectively. In some instances, however, the soft breaking point may be located at the same position as one of the hard breaking points. The soft breaking point 502 can be used to break the combinational loop 202 such that the graph associated with the combinational loop 202 is a DAG. The soft breaking point 502 can represent a breaking point that is common across all views. That is, the soft breaking point 502 can break the combinational loop 202 in every view based on the merged constraints of all views.

The soft breaking point 502 is used to structurally break the loop in the concurrent MMMC view 500, but is not used to break a timing path associated with an SMSC view, such as the first view 200 and the second view 250 shown in FIGS. 2A and 2B. Instead, the soft breaking point 502 is used as a settling point for timing propagation in that view. For the CMMMC view 500, the timing propagation, such as for example, for arrival time propagation or required time propagation, is carried out across all the views. Therefore, the soft breaking point 502 serves as a settling point to start and stop the timing propagation. For example, assuming that the arrival time of value of 3 is determined at the input of the first buffer 206 with the soft breaking point 502. As this is a soft breaking point, the STA processor 100 will propagate the same value forward through the delay arc 230 of the first buffer 206. This is unlike a hard breaking point, which if located at the 502 would have not propagated the arrival time forward. Thus, the soft breaking point 502 is used as a settling point for time propagation around the combinational loop in the concurrent MMMC view. As a result, when the STA processor 100 carries out the STA SMSC run for each of the first view 200 and the second view 250, the STA processor 100 utilizes the hard breaking point determined for the respective view, but uses the soft breaking point associated for the MMMC view for time propagation. This ensures that the breaking point determined for the MMMC view (e.g., view in MMMC setup) does not conflict with the breaking point for the (same) SMSC view for timing path purposes.

In some examples, the STA processor 100 can include a bank of processors that can be run in parallel to reduce the run time for executing at least a portion of the processes 300 or 400. For example, the STA processor 100 can execute the determination of hard breaking point for each view in parallel to speed up the time required to determine the hard breaking points.

Figure 6:
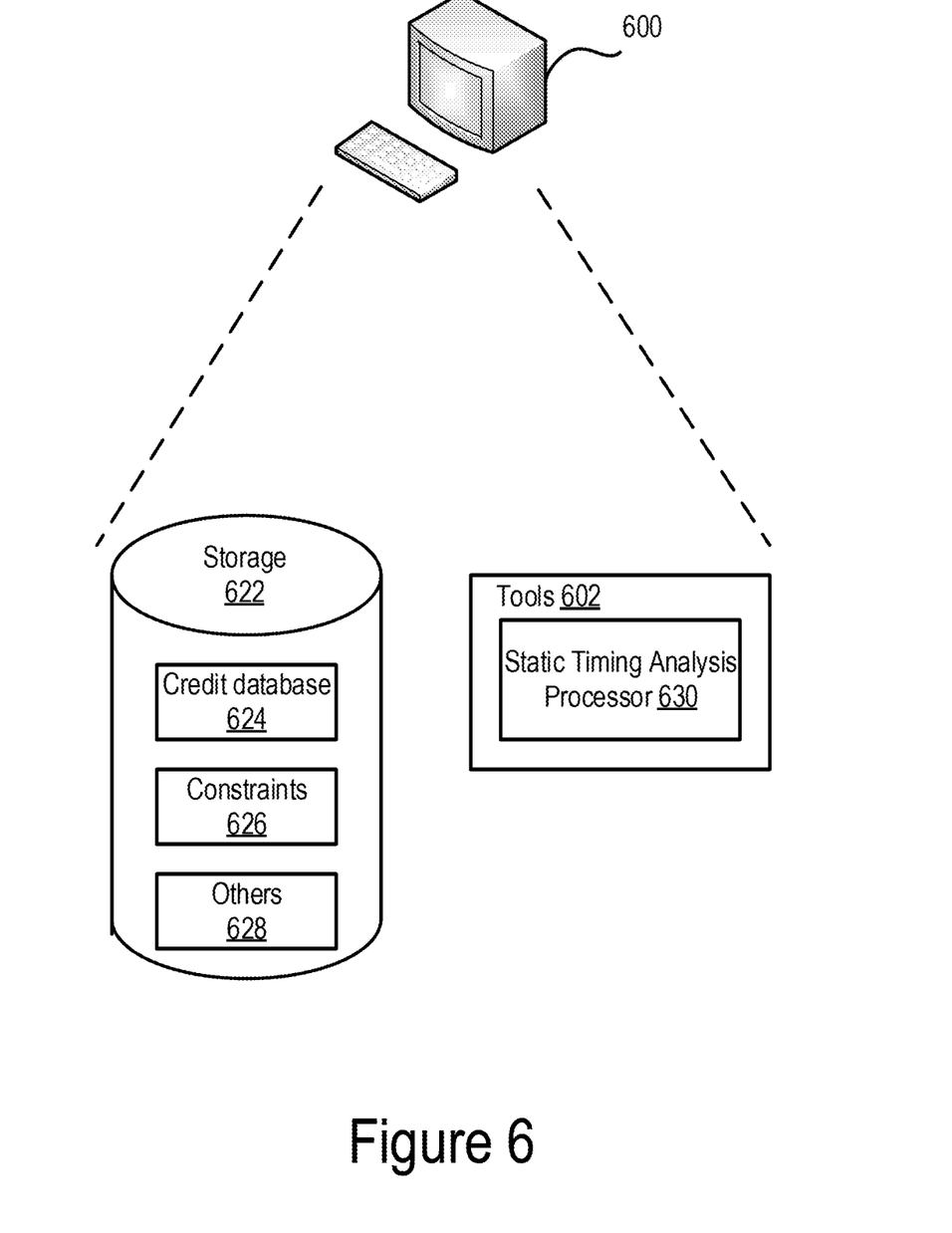
FIG. 6 is a functional block diagram of an example computing system for using static timing analysis of integrated circuits, according to the present embodiments

FIG. 6 is a functional block diagram of an example computing system 600 for using static timing analysis of integrated circuits according to the present embodiments. In some embodiments, the system 600 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 600 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 600 may further write to and read from a local or remote volatile or non-volatile computer accessible storage 622 that stores thereon data or information such as, but not limited to, one or more databases such as post-placement layouts, schematic design database(s) or physical design database(s) (e.g., GDS II or OASIS data, etc.), circuit stage credit database 624, libraries, rule decks, constraints (e.g., timing constraints such as required arrival time, etc.), etc. 626, and/or other information or data 628 (e.g., netlists, derates, parasitic data, SDF, etc.) that may be required to support the methodology of the present embodiments. According to certain aspects, the databases and libraries in the storage 622 are extendable or changeable (e.g., via APIs and the like) without changing other components or data in system 600.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 600 may, by various standalone software, hardware modules or combinations thereof 602 (e.g., EDA tool), include the static timing analysis processor 630 that generates timing information related to various timing views, as discussed above. The static timing analysis processor 630 can execute the processes 300 and 400 discussed above in relation to FIGS. 3 and 4, respectively, and the steps otherwise discussed in relation to FIGS. 1-6. The static timing analysis processor 630 may be implemented by adapting or communicating with certain pre-existing modules (e.g., design workflow, design timing, design optimization, design sign-off, etc.) as may be required to implement a methodology to implement timing analysis of timing graphs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method, comprising:
   receiving, by a computing system, at least one data file describing a netlist representing an electronic circuit design;
   receiving, by the computing system, constraints for a plurality of single-mode-single-corner (SMSC) views of the electronic circuit design, each SMSC view of the plurality of SMSC view defining a set of timing constraints for the electronic circuit design;
   identifying, by the computing system, a combinational loop in the electronic circuit design for each SMSC view of the plurality of SMSC views based on the respective set of timing constraints;
   determining, by the computing system, a hard breaking point for the combinational loop in each SMSC view of the plurality of SMSC views;
   merging, by the computing system, timing constraints associated with the plurality of SMSC views to generate a merged set of timing constraints for a multi-mode-multi-corner (MMMC) view;
   determining, by the computing system, a soft breaking point associated with the MMMC view based on the merged set of timing constraints, the soft breaking point not breaking timing paths in any of the SMSC views of the plurality of SMSC views;
   executing, by the computing system, a static timing analysis (STA) run of the MMMC view based on the merged set of timing constraints; and
   propagating, by the computing system, timing information across the combinational loop by utilizing the soft breaking point as a settling point.

2. The method of claim 1, further comprising:
   determining, by the computing system, a set of structural combinational loops in the electronic circuit design based on the netlist;
   identifying, by the computing system, the combinational loop for each SMSC view based on the set of structural combinational loops and based on a respective set of timing constraints.

3. The method of claim 2, further comprising:
   determining, by the computing system, the hard breaking point by excluding a portion of the netlist that does not represent the set of structural combinational loops.

4. The method of claim 2, further comprising:
   determining, by the computing system, the set of structural combinational loops in the electronic circuit design based on excluding the sets of timing constraints defined by the plurality of SMSC views.

5. The method of claim 2, wherein determining the set of structural combinational loops includes utilizing, by the computing system, a breath-first-search algorithm to determine the set of structural combinational loops.

6. The method of claim 1, further comprising:
   determining, by the computing system, the soft breaking point associated with the MMMC view based on an entirety of the netlist representing an electronic circuit design.

7. The method of claim 1, wherein the merged set of timing constraints includes a superset of the sets of timing constraints associated with the plurality of SMSC views.

8. The method of claim 1, wherein the plurality of SMSC views can be based on modes including at least one of sleep mode operation, low power mode operation, or design for test mode operation.

9. The method of claim 1, wherein the plurality of SMSC views can be based on corners including at least one of process, voltage, or temperature.

10. The method of claim 1, further comprising:
    executing, by the computing system, an STA run for at least one SMSC view of the plurality of SMSC views, wherein a breaking point determined for the at least one SMSC view matches the hard breaking point corresponding to the same SMSC view in the STA run of the MMMC view.

11. A non-transitory computer readable storage medium having instructions stored thereon which when executed by one or more processors, cause the one or more processors to:
    receive at least one data file describing a netlist representing an electronic circuit design;
    receive constraints for a plurality of single-mode-single-corner (SMSC) views of the electronic circuit design, each SMSC view of the plurality of SMSC view defining a set of timing constraints for the electronic circuit design;

identify a combinational loop in the electronic circuit design for each SMSC view of the plurality of SMSC views based on the respective set of timing constraints;

determine a hard breaking point for the combinational loop in each SMSC view of the plurality of SMSC views;

merge timing constraints associated with the plurality of SMSC views to generate a merged set of timing constraints for a multi-mode-multi-corner (MMMC) view;

determine a soft breaking point associated with the MMMC view based on the merged set of timing constraints, the soft breaking point not breaking timing paths in any of the SMSC views of the plurality of SMSC views;

execute a static timing analysis (STA) run of the MMMC view based on the merged set of timing constraints; and propagate timing information across the combinational loop by utilizing the soft breaking point as a settling point.

12. The non-transitory computer readable storage medium of claim 11, wherein the instructions when executed, cause the one or more processors to:

determine a set of structural combinational loops in the electronic circuit design based on the netlist; and identify the combinational loop for each SMSC view based on the set of structural combinational loops and based on a respective set of timing constraints.

13. The non-transitory computer readable storage medium of claim 12, wherein the instructions when executed, cause the one or more processors to:

determine the hard breaking point by excluding a portion of the netlist that does not represent the set of structural combinational loops.

14. The non-transitory computer readable storage medium of claim 12, wherein the instructions when executed, cause the one or more processors to:

determine the set of structural combinational loops in the electronic circuit design based on excluding the sets of timing constraints defined by the plurality of SMSC views, or based on utilizing a breath-first-search algorithm to determine the set of structural combinational loops.

15. The non-transitory computer readable storage medium of claim 11, wherein the instructions when executed, cause the one or more processors to:

determine the soft breaking point associated with the MMMC view based on an entirety of the netlist representing an electronic circuit design.

16. The non-transitory computer readable storage medium of claim 11, wherein the merged set of timing constraints includes a superset of the sets of timing constraints associated with the plurality of SMSC views.

17. The non-transitory computer readable storage medium of claim 11, wherein the plurality of SMSC views can be based on:

modes, including at least one of sleep mode operation, low power mode operation, or design for test mode operation; or corners, including at least one of process, voltage, or temperature.

18. The non-transitory computer readable storage medium of claim 11, wherein the instructions when executed, cause the one or more processors to:

execute an STA run for at least one SMSC view of the plurality of SMSC views, wherein a breaking point determined for the at least one SMSC view matches the hard breaking point corresponding to the same SMSC view in the STA run of the MMMC view.

19. A system comprising:

one or more processors, the one or more processors configured to:

receive at least one data file describing a netlist representing an electronic circuit design;

receive constraints for a plurality of single-mode-single-corner (SMSC) views of the electronic circuit design, each SMSC view of the plurality of SMSC view defining a set of timing constraints for the electronic circuit design;

identify a combinational loop in the electronic circuit design for each SMSC view of the plurality of SMSC views based on the respective set of timing constraints;

determine a hard breaking point for the combinational loop in each SMSC view of the plurality of SMSC views;

merge timing constraints associated with the plurality of SMSC views to generate a merged set of timing constraints for a multi-mode-multi-corner (MMMC) view;

determine a soft breaking point associated with the MMMC view based on the merged set of timing constraints, the soft breaking point not breaking timing paths in any of the SMSC views of the plurality of SMSC views;

execute a static timing analysis (STA) run of the MMMC view based on the merged set of timing constraints; and propagate timing information across the combinational loop by utilizing the soft breaking point as a settling point.

20. The system of claim 19, wherein the one or more processors are configured to:

determine a set of structural combinational loops in the electronic circuit design based on the netlist; and identify the combinational loop for each SMSC view based on the set of structural combinational loops and based on a respective set of timing constraints.

\* \* \* \* \*